(12) United States Patent
Patel

(10) Patent No.: US 10,332,175 B2
(45) Date of Patent: *Jun. 25, 2019

(54) COMPATIBILITY GUIDANCE METHOD FOR A UNIVERSAL AUTOMOTIVE ACCESSORY FOR AN ONLINE AND IN-STORE MARKETPLACE

(71) Applicant: Rohan Vishnubhai Patel, Bensalem, PA (US)

(72) Inventor: Rohan Vishnubhai Patel, Bensalem, PA (US)

(73) Assignee: Rohan Patel, Bensalem, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/214,055

(22) Filed: Dec. 8, 2018

(65) Prior Publication Data

US 2019/0108569 A1    Apr. 11, 2019

(51) Int. Cl.
| | | |
|---|---|---|
| G06Q 30/00 | (2012.01) | |
| G06Q 30/06 | (2012.01) | |
| G06F 3/0483 | (2013.01) | |
| G06F 3/0482 | (2013.01) | |

(52) U.S. Cl.
CPC ....... *G06Q 30/0621* (2013.01); *G06F 3/0482* (2013.01); *G06F 3/0483* (2013.01); *G06Q 30/0641* (2013.01)

(58) Field of Classification Search
CPC .................................................. G06Q 30/06–08
USPC ................................................ 705/26.1–27.2
See application file for complete search history.

(56) References Cited

U.S. PATENT DOCUMENTS

| | | | | |
|---|---|---|---|---|
| 2006/0202501 | A1* | 9/2006 | Tadakamalla | B60J 1/2016 296/97.8 |
| 2009/0019008 | A1* | 1/2009 | Moore | G06Q 30/02 |
| 2010/0018466 | A1* | 1/2010 | Austin | A01K 1/0272 119/28.5 |
| 2011/0042995 | A1* | 2/2011 | Benites | B60J 1/20 296/97.11 |
| 2014/0103085 | A1* | 4/2014 | Patronik | B60R 7/005 224/318 |
| 2016/0288635 | A1* | 10/2016 | Morazan | B60J 11/04 |
| 2019/0084382 | A1* | 3/2019 | Patel | B60J 1/2011 |

OTHER PUBLICATIONS www.wholesalecarcovers.com/products-economy_car_cover.html (Aug. 19, 2011, 2 pages (Year: 2011).*
www.wholesalecarcovers.com/elite_car_sizing.html (Aug. 18, 2011, 12 pages) (Year: 2011).*

(Continued)

*Primary Examiner* — Ethan D Civan

(57) ABSTRACT

A compatibility guidance method for a universal automotive accessory for an online marketplace provides a combination of make, model and year of a vehicle for customer to confirm particular universal automotive accessory's compatibility with given combination of vehicle during online shopping. By this process of providing compatibility guidance from premeasured data of vehicles saves a customer hassle of measuring and checking compatibility themselves. For in store purchases a potential customer can be directed to a webpage where the potential customer can find compatibility guidance for a universal automotive accessory.

24 Claims, 2 Drawing Sheets

(56) References Cited

OTHER PUBLICATIONS www.wholesalecarcovers.com/products-seat_covers.html (Aug. 23, 2011, 2 pages) (Year: 2011).*
www.wholesalecarcovers.com/products-universal_floo_mats.html (Sep. 2, 2011, 2 pages) (Year: 2011).*

* cited by examiner

US 10,332,175 B2

COMPATIBILITY GUIDANCE METHOD FOR A UNIVERSAL AUTOMOTIVE ACCESSORY FOR AN ONLINE AND IN-STORE MARKETPLACE

CROSS-REFERENCE TO RELATED APPLICATIONS

This application is continuation-in-part of non-provisional application Ser. No. 15/715,775 which claims the benefit of U.S. Provisional Application No. 62/376,708 filed on Aug. 18, 2016, and U.S. Provisional Application No. 62/530,999 filed on Jul. 11, 2017, which is incorporated by reference herein.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

FIELD OF INVENTION

The present invention relates to check a compatibility of a universal automotive accessory to a specific vehicle for online as well as in store shopping. Many universal automotive accessories fit many vehicles but not all vehicles. Before purchasing such accessories customer need to measure and or make sure its compatibility to a given vehicle. This method requires seller of a universal automotive accessory to measure all vehicles in advance and provide guidance to the customer and save the customers hassle of measuring themselves. A compatibility chart can help list out all the vehicles for customers to make sure before purchasing an automotive accessory. An innovative size selection process for automotive accessory where an accessory would fit multiple vehicles but not all thus a chart that provides guidance to consumer weather an accessory should fit one specific vehicle or not. A window shade for instance needs one's car windshield to be measured instead having a chart from premeasured windshield helps customer to pick right size for their vehicle quickly.

BACKGROUND OF THE INVENTION

The present disclosure relates generally to a universal accessory's compatibility guidance chart for shopping in online market place as well as in store. For in store marketplace the potential customer needs to go to a web page to check compatibility of a universal automotive accessory. More so, the present invention relates to a sunshade for car windows, and other universal fit automotive accessories.

DESCRIPTION OF RELATED ART

There are several types of compatibility charts in market for automotive parts but there isn't any method to check compatibility of an universal accessory to a specific vehicle available presently, thus present process involves customer to measure or check compatibility for their vehicles by measuring the vehicles themselves. A Compatibility guidance chart for universal automotive accessory can save lots of time and mistakes made by consumers by just finding their vehicle in the compatibility chart before purchasing any automotive accessory from online marketplace.

However, conventional method of have customer measure their own windshield is very inefficient and inaccurate if customer does not measure the windshield according to the guidelines provided on the online marketplace's product listing.

BRIEF SUMMARY OF THE INVENTION

A primary objective of the present disclosure is to provide compatibility guidance of a universal automotive accessory to a customer for a given vehicle during online shopping.

DESCRIPTION OF THE DRAWINGS

Figure 1:
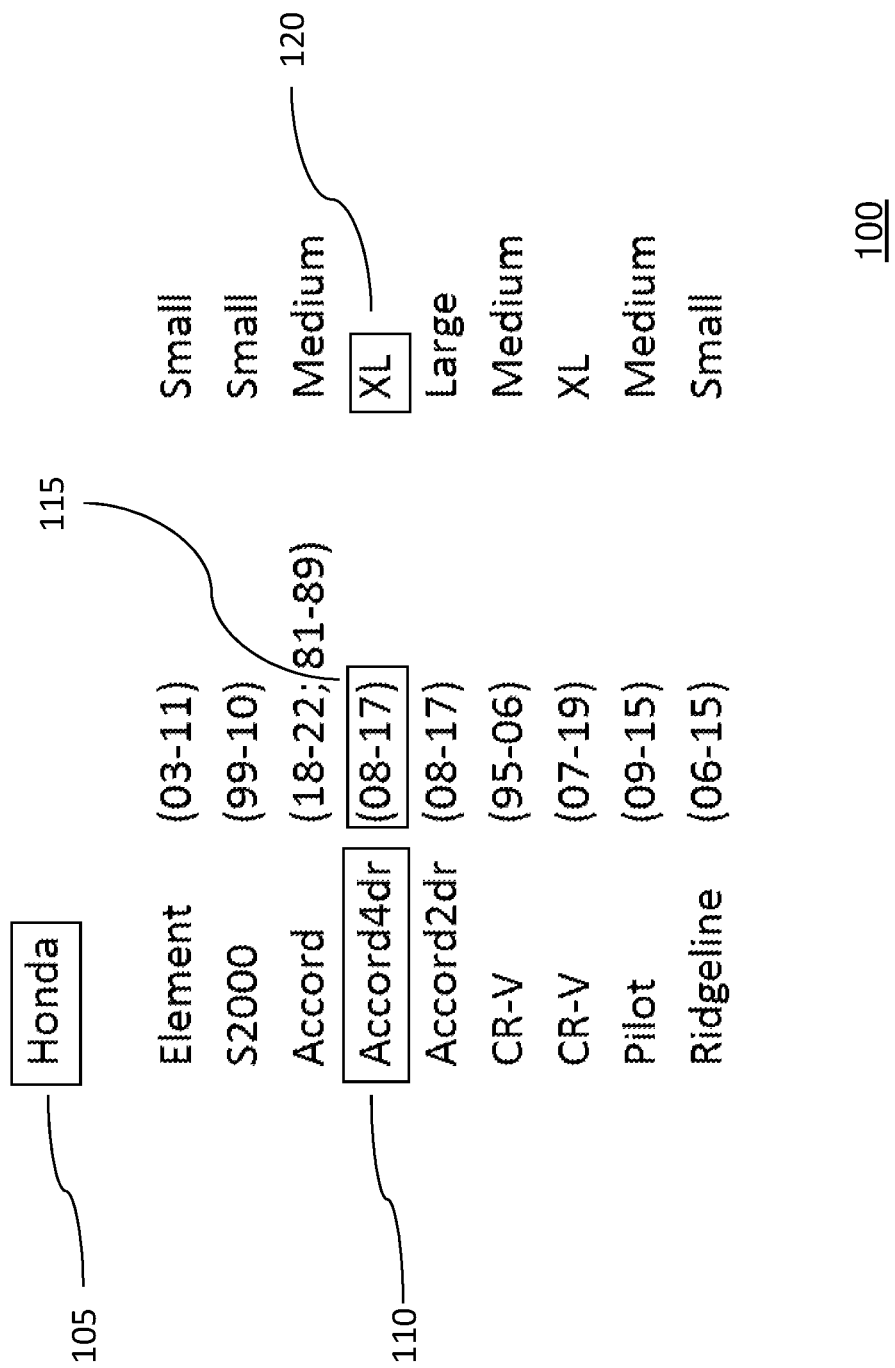
Figure 2:
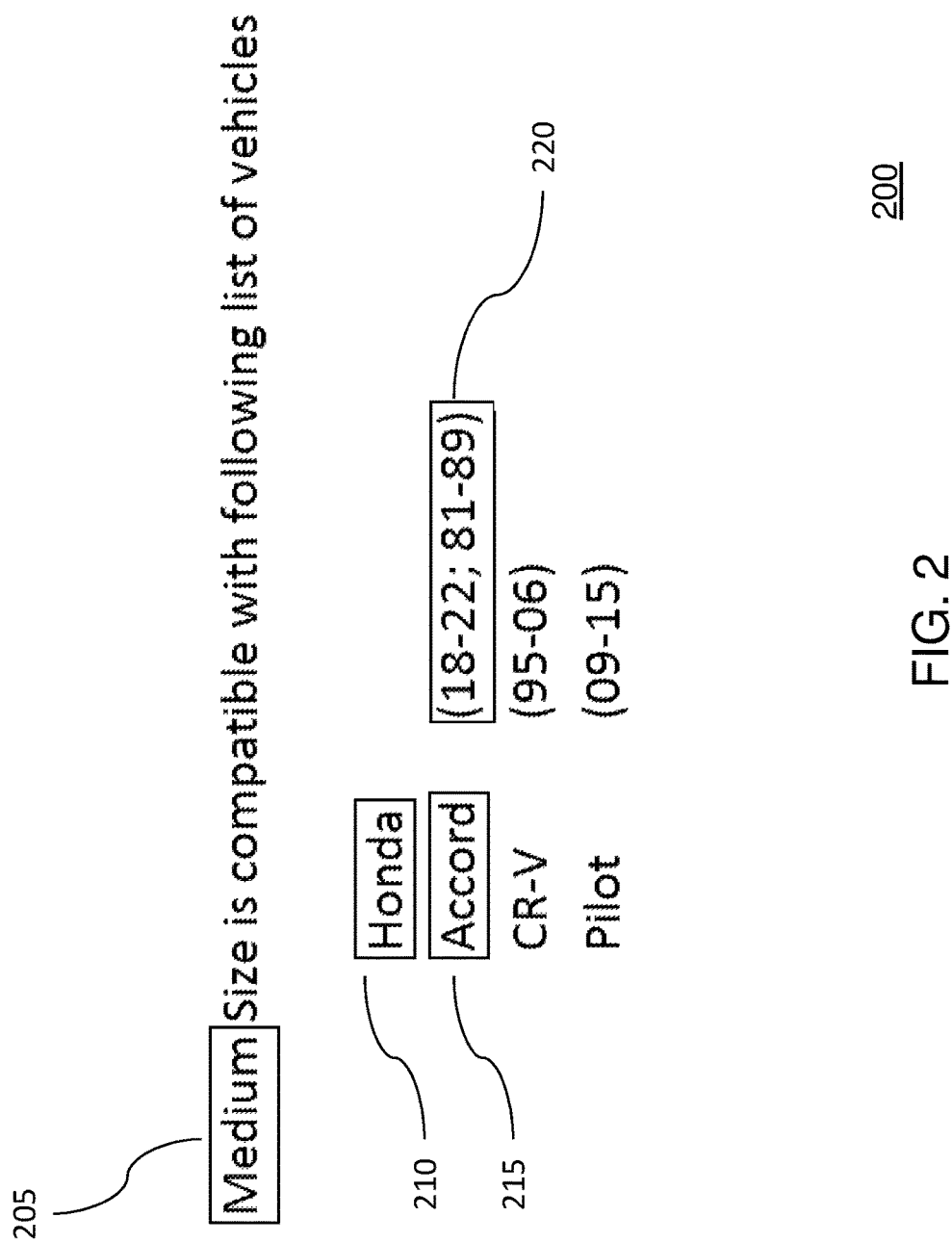

Having thus described the disclosure in general terms, reference will now be made to the accompanying figure, wherein:

FIG. 1 illustrates a size guidance chart 100 to help customer choose closest size for a given vehicle, in accordance with an embodiment of the present disclosure; and FIG. 2 illustrates a size guidance chart 200 with a list of vehicles that fits a given particular automotive accessory, in accordance with another embodiment of the present disclosure.

It should be noted that the accompanying figure are intended to present illustrations of exemplary embodiments of the present disclosure. This figure is not intended to limit the scope of the present disclosure. It should also be noted that accompanying figure is not necessarily drawn to scale.

DETAILED DESCRIPTION OF THE INVENTION

FIG. 1 illustrates a size guidance chart 100, in accordance with an embodiment of the present disclosure. The size guidance chart 100 allows a user select an appropriate size of a vehicle accessory for a particular maker and model of an automobile during shopping or selection on a website. The size guidance chart 100 allows a user to find an appropriate size of an automotive accessory based on make, model and year of his automobile. For example, a vehicle accessory can be a windshield sunshade, side window sunshade or any other automobile accessory which is compatible to multiple vehicles.

The size guidance chart 100 has several vehicle models of an automobile manufacturer Honda but similar guidance chart can be made to guide customers to check compatibility of given automobile accessory to a specific vehicle model during their shopping on a website. A maker 105 is shown to be selected as 'Honda'. The size guidance chart 100 further has a model 110, which is shown to be 'Accord4dr'. Further, the size guidance chart 100 also has year (range or standalone) 115. Year 115 is shown to 08-17 (2008 to 2017). Moreover, the size guidance chart 100 shows a size 120 of a sunshade. The size is shown to be 'XL'. Based on the maker 105, model 110 and year 115, a user identifies an appropriate size of a sunshade for the automobile. For example, if a user has 'Honda' make, 'Element' model and a year being of year 2003 to 2011, an appropriate size of a sunshade is 'Small'. In another example, if a user has a 'Honda' make, 'Accord4dr' model and a year being of year 2008 to 2017, an appropriate size for this particular vehicle is 'XL'. It should be noted that the size guidance chart 100 is shown for illustration purposes only and does not limit the scope of the present disclosure. It will be apparent to a person ordinarily skilled in the art that the size guidance chart 100 is shown for illustration purpose only and can be appropriately modified to be used for shopping. For example, a user can select a maker of an automobile, model and year for the automobile and type of window (windshield, door window and so forth) to see an appropriate size of an automobile accessory (such as a sunshade in 100) for the automobile.

FIG. 2 illustrates a size guidance chart 200, in accordance with another embodiment of the present disclosure. The size guidance chart 200 shows a list of automobiles compatible to a given Automobile Accessory and list of vehicles that this given accessory is compatible which helps customer check compatibility of given product with their vehicle during shopping on a website. The size guidance chart 200 is shown to be for a specific size of a sunshade as shown in FIG. 1. For a predefined size of a sunshade, the size guidance chart 200 shows make, model and years of compatible automobiles. It will be apparent to a person ordinarily skilled in the art that the size guidance chart 200 is shown for illustration purpose only and can be appropriately modified to be used for shopping. For example, a user can select a size of an automobile accessory (such as a sunshade in 100), a maker, model and year for the automobile compatible the selected size of accessory can be displayed to user.

Present disclosure provides several advantages over existing art. It allows customer to check compatibility of given accessory without worrying about its compatibility their vehicle hassle-free.

What is claimed is:

1. A guidance method for suggesting an automotive accessory including the following steps:
   a. measuring at least one automotive dimension for a given accessory for each make, model and year of a vehicle;
   b. recording the measurement data of automotive dimensions for each make, model and year of a vehicle: and
   c. suggesting one of the following automotive accessories on a webpage based on step b:
   1. at least one automotive window accessory:
   2. at least one automotive storage accessory:
   3. at least one automotive steering accessory:
   4. at least one automotive license plate accessory:
   5. at least one automotive sun visor accessory:
   6. at least one automotive mobile device accessory:
   wherein the combination of steps a, b and c does not require an end-user to pre-measure any dimensions.

2. The guidance method of claim 1, wherein step c includes providing a list of compatible vehicles for a given accessory.

3. The guidance method of claim 1, wherein step c includes helping a customer choose a closest fitment option of an automotive accessory for a given vehicle.

4. The guidance method of claim 1, wherein step c includes providing compatibility of a Car Sun Shade on an online market place from premeasured window measurement data for a given vehicle.

5. The guidance method of claim 1, wherein step c includes providing a drop down to select the vehicle on a website.

6. The guidance method of claim 1, wherein step c includes providing compatibility information on a windshield sun shade's compatibility to a given vehicle.

7. The guidance method of claim 1, wherein step c includes providing compatibility information on window snow cover compatibility with a given vehicle.

8. The guidance method of claim 1, wherein step c includes providing a guide about compatible vehicles for a door window sun shade.

9. The guidance method of claim 1, wherein step c includes providing a guide about compatible vehicles for an automotive storage product's compatibility.

10. The guidance method of claim 1, wherein step c includes providing a guide about compatible vehicles for a steering wheel accessory to a given vehicle.

11. The guidance method of claim 1, wherein step c includes providing compatibility guidance for sun visor accessory to a given vehicle.

12. The guidance method of claim 1, wherein step c includes providing compatibility guidance for a license plate accessory to a given vehicle.

13. The guidance method of claim 1, wherein step c includes providing compatibility guidance for a windshield glass related accessory to a given vehicle.

14. The guidance method of claim 1, wherein step c includes providing compatibility guidance for a mobile device related accessory for a given vehicle.

15. A guidance method for suggesting an automotive accessory for in-store shopping including the following steps:
   a. measuring at least one automotive dimension for each make, model and year;
   b. recording the measurement data of automotive dimensions for each make, model and year of a vehicle; and
   c. directing an in-store end-user to a webpage and suggesting an automotive accessory on a webpage based on steps a & step b;
   wherein the combination of steps a, b and c does not require the end-user to pre-measure any dimensions.

16. The guidance method of claim 15, wherein step c includes providing includes list of compatible vehicles for a given accessory.

17. The guidance method of claim 15, wherein step c includes helping a customer choose a closest fitment option of an automotive accessory for a given vehicle.

18. The guidance method of claim 15, wherein step c includes providing compatibility guidance regarding an automotive sun shade on an online market place from premeasured glass measurement data for a given vehicle.

19. The guidance method of claim 15, wherein step c includes providing a drop down to select the vehicle on a website.

20. The guidance method of claim 15, wherein step c includes providing compatibility guidance for a pet accessory for a given vehicle.

21. The guidance method of claim 15, wherein step c includes providing compatibility guidance for an automotive license plate accessory for a given vehicle.

22. The guidance method of claim 15, wherein step c includes providing compatibility guidance for an automotive steering cover for a given vehicle.

23. The guidance method of claim 15, wherein step c includes providing compatibility guidance for an automotive storage accessory for a given vehicle.

24. The guidance method of claim 15, wherein step c includes providing compatibility guidance for an automotive sun visor accessory for a given vehicle.

* * * * *